(12) United States Patent
Pickrell et al.

(10) Patent No.: US 10,941,308 B2
(45) Date of Patent: Mar. 9, 2021

(54) WATER-BASED ELECTRICALLY-INSULATING ENERGY-CURABLE FLUIDS

(71) Applicant: SUN CHEMICAL CORPORATION, Parsippany, NJ (US)

(72) Inventors: Michael Ronald Pickrell, Bristol (GB); Derek Ronald Illsley, Bath (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 16/314,237

(22) PCT Filed: Jul. 25, 2017

(86) PCT No.: PCT/US2017/043663
§ 371 (c)(1),
(2) Date: Dec. 28, 2018

(87) PCT Pub. No.: WO2018/022584
PCT Pub. Date: Feb. 1, 2018

(65) Prior Publication Data
US 2019/0218409 A1  Jul. 18, 2019

Related U.S. Application Data

(60) Provisional application No. 62/367,290, filed on Jul. 27, 2016, provisional application No. 62/373,524, filed on Aug. 11, 2016.

(51) Int. Cl.
| | | |
|---|---|---|
| *C09D 11/38* | (2014.01) |
| *C09D 11/322* | (2014.01) |
| *B41M 7/00* | (2006.01) |
| *C09D 11/101* | (2014.01) |
| *C09D 11/52* | (2014.01) |
| *C09D 11/324* | (2014.01) |
| *C09D 11/328* | (2014.01) |

(52) U.S. Cl.
CPC .......... *C09D 11/38* (2013.01); *B41M 7/0045* (2013.01); *B41M 7/0081* (2013.01); *C09D 11/101* (2013.01); *C09D 11/322* (2013.01); *C09D 11/52* (2013.01); *C09D 11/324* (2013.01); *C09D 11/328* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 6,846,851 B2 | 1/2005 | Nakhmanovich et al. | |
| 7,439,285 B2 | 10/2008 | Mozel et al. | |
| 8,939,565 B2 | 1/2015 | Belelie et al. | |
| 2004/0106699 A1* | 6/2004 | Ishikawa | C09D 11/101 523/160 |

(Continued)

FOREIGN PATENT DOCUMENTS

| | | |
|---|---|---|
| EP | 1 543 704 B1 | 5/2006 |
| EP | 2 639 272 A1 | 9/2013 |

(Continued)

OTHER PUBLICATIONS

U.S. Appl. No. 16/320,233, filed Jan. 24, 2019.
PCT International Search Report issued in PCT/US17/43676 dated Oct. 6, 2017.
Written Opinion of the International Searching Authority issued in PCT/US17/43676 dated Oct. 6, 2017.

(Continued)

*Primary Examiner* — Manish S Shah
(74) *Attorney, Agent, or Firm* — Marian E. Fundytus; Ostrolenk Faber LLP

(57) ABSTRACT

Water based, energy curable ink jet compositions that have good insulating properties are described herein. The inventive water based energy curable ink jet compositions include a water soluble or water dispersible component polymerizable by free radical polymerization upon exposure to polymerizing radiation, wherein the cured ink jet compositions have good insulating properties, exhibited for example, by its breakdown voltage. Also described are electronic devices including ink jet-printed layers of the ink jet compositions.

23 Claims, No Drawings

(56) References Cited

U.S. PATENT DOCUMENTS

| | | | |
|---|---|---|---|
| 2004/0209976 A1 | 10/2004 | Nakhmanovich et al. | |
| 2007/0117271 A1* | 5/2007 | Kodas | C09D 11/30 438/122 |
| 2008/0085369 A1 | 4/2008 | Cai et al. | |
| 2008/0186373 A1 | 8/2008 | Rolly | |
| 2008/0282932 A1 | 11/2008 | Kiomoto et al. | |
| 2009/0163615 A1 | 6/2009 | Halahmi et al. | |
| 2010/0152316 A1 | 6/2010 | Cornell et al. | |
| 2011/0104453 A1 | 5/2011 | Shjinjo et al. | |
| 2011/0175089 A1 | 7/2011 | Zheng et al. | |
| 2012/0306964 A1 | 12/2012 | Nakajima | |
| 2014/0151606 A1 | 6/2014 | Lowenthal et al. | |
| 2014/0151607 A1 | 6/2014 | Lowenthal et al. | |
| 2014/0347427 A1 | 11/2014 | Yamashita et al. | |
| 2014/0362150 A1 | 12/2014 | Yamashita et al. | |
| 2015/0175822 A1* | 6/2015 | Andre | C09D 11/322 347/102 |
| 2015/0191614 A1 | 7/2015 | Nagashima et al. | |
| 2015/0329730 A1 | 11/2015 | Yang et al. | |
| 2015/0361285 A1* | 12/2015 | Breton | C09D 11/38 347/20 |
| 2016/0046816 A1 | 2/2016 | Takahashi et al. | |
| 2017/0253051 A1* | 9/2017 | Brust | C09D 11/101 |

FOREIGN PATENT DOCUMENTS

| | | | |
|---|---|---|---|
| EP | 2 960 306 A1 | 12/2015 | |
| JP | H0597944 A | 4/1993 | |
| JP | 2003/292857 | 10/2003 | |
| JP | 2012184376 A | 9/2012 | |
| JP | 2013119574 A | 6/2013 | |
| JP | 2013216864 A | 10/2013 | |
| JP | 2015174231 A | 10/2015 | |
| WO | WO 03093378 A1 | 11/2003 | |
| WO | WO 2004028225 A1 | 4/2004 | |
| WO | WO 2008/031720 A1 | 3/2008 | |
| WO | WO 2013024928 A1 | 2/2013 | |
| WO | WO 2014/045192 A1 | 3/2014 | |
| WO | WO 2014/085473 | 6/2014 | |
| WO | WO 2014/098002 A1 | 6/2014 | |
| WO | WO 2014/111349 | 7/2014 | |
| WO | WO 2014/119771 A1 | 8/2014 | |
| WO | WO 2014/168240 A1 | 10/2014 | |
| WO | WO 2015/116028 A1 | 8/2015 | |
| WO | WO 2015/148094 A1 | 10/2015 | |
| WO | WO 2015/158752 A1 | 10/2015 | |
| WO | WO 2015/183719 A1 | 12/2015 | |
| WO | WO 2015/189639 A2 | 12/2015 | |
| WO | WO 2015/197472 A1 | 12/2015 | |
| WO | WO-2015189639 A2 * | 12/2015 | C09D 11/322 |
| WO | WO 2016/178989 A1 | 11/2016 | |
| WO | WO 2017/004258 A1 | 1/2017 | |
| WO | WO 2015/189639 A2 | 12/2017 | |

OTHER PUBLICATIONS

N-Methyl-2-Pyrrolidone (NMP) (Eastman Chemical Company) Oct. 8, 2015, second page.
EuPIA Guideline on Printing Inks Applied to the Non-Food Contact Surface of Food Packaging Materials and Articles, Nov. 2011, p. 6.
Written Opinion of the International Searching Authority issued in PCT/US2017/043663 dated Oct. 6, 2017.
PCT International Search Report issued in PCT/US2017/043663 dated Oct. 10, 2017.
International Preliminary Report on Patentability issued in PCT/US2017/043676 dated Jan. 29, 2019.
International Preliminary Report on Patentability issued in PCT/US2017/043663 dated Jan. 29, 2019.
Supplementary EP Search Report issued in courter part EP 17 83 5102 dated Mar. 11, 2020.
Svab L et al: "A calorimeter for the determination of enthalpies of vaporization at high temperatures and pressures", Journal of Chemical Thermodynamics, Academic Press, London, GB, vol. 20, No. 5, May 1, 1988, pp. 545-550, XP023946779, ISSN: 0021-9614, DOI: 10.1016/0021-9614(88)90082-1 [retrieved on May 1, 1988].
Majer V et al: "Enthalpies of vaporization and cohesive energies for a group of chlorinated hydrocarbons", Journal of Chemical Thermodynamics, Academic Press, London, GB, vol. 12, No. 9, Sep. 1, 1980, pp. 843-847, XP023945443, ISSN:0021-9614,DOI: 10.1016/0021-9614(80)90028-2 [retrieved on Sep. 1, 1980].
Anonymous: "2-Methylpropane-1,3-diol C4H1002: ChemSpider",Jan. 1, 2020, XP055667621, Retrieved from the Internet: URL:http://www.chemspider.com/Chemical-Str ucture.67654.html [retrieved on Feb. 12, 2020].
Anonymous: "1,2-Ethanediol", Jan. 1, 2018, XP055667602, Retrieved from the Internet: URL:https://webbook.nist.gov/cgi/cbook.cgi ?ID=C107211&Mask=4 [retrieved on Feb. 12, 2020] * paragraph "Enthalpy of Vaporization" on pp. 3 and 4*.
Supplementary EP Search Report issued in courter part EP 17 83 5107 dated Mar. 11, 2020.

* cited by examiner

WATER-BASED ELECTRICALLY-INSULATING ENERGY-CURABLE FLUIDS

The present application is a § 371 National Stage application of PCT/US2017/043663 filed Jul. 25, 2017, which claims priority to U.S. Provisional Patent Application No. 62/367,290 filed Jul. 27, 2016, and U.S. Provisional Patent Application No. 62/373,524 filed Aug. 11, 2016, each of which is incorporated herein by reference in its entirety.

INCORPORATION BY REFERENCE

The present International application filed under the provisions of the Patent Cooperation Treaty (PCT) hereby incorporates by reference in its entirety the International application filed under the provisions of the PCT having PCT/US17/43676, filed on the same date as the present International application.

BACKGROUND OF THE INVENTION

Solvent-free, UV-curable inkjet compositions are used in fabricating electrical devices and components. These inks can be printed with ink jet devices onto substrates and printed in combinations to provide an arrangement of inks exhibiting particular electrical properties. However, no record of the use of water-based UV-curable dielectric/electrically insulating inkjet compositions has been found.

A dielectric is an electrical insulator that can be polarized in the direction of an electrical field. Polymers having dipolar content, such as poly(vinyl pyrolidone), poly(methyl acrylate), poly(vinyl chloride), polyamides, and others, are used as the dielectric layer in electronic devices. These polymers have dielectric constants (k) typically in the range 2 to 5, indicative of their good insulating properties. In comparison, $TiO_2$ has a dielectric constant of 100 and is a poor insulator. The dielectric constant k is defined as the ratio of the permittivity of a substance to that of a vacuum.

Dielectric materials are used as electrically insulating layers in electronic devices, thereby preventing electrical leakage between distinct conducting patterns. Leakage may cause short circuits. Dielectric materials also have the ability to polarize in the direction of the electric field, thereby reducing the electromagnetic coupling effect between separated conducting tracks.

Insulators having low dielectric constants are preferred, since those with high dielectric constants can be prone to physical and electrical breakdown when subjected to electric fields and hence they lose their insulating capacity.

Dielectric materials are used in a wide variety of electronic devices, such as transistors, semiconductors, diodes, capacitors, resistors, photovoltaic cells, batteries, light emitting diodes (LEDs), and organic light emitting diodes (OLEDs), among other devices. The patterning of material layers in electrical devices, e.g., conductive layers and dielectric layers, is becoming more complicated and requires finer shapes in response to miniaturization of the wiring and multi-layering of materials. Also, the capacity for electrical devices to be patterned onto a variety of substrates, including flexible substrates such as polymeric materials, is also requirement growing in prevalence.

Conventional techniques employed to fabricate electrical devices such as semiconductors employ subtractive processes, such as etching. In contrast thereto, fabricating a device through inkjet printing, which may be considered to be an additive process, would significantly reduce the number of process steps, reduce energy usage, and reduce waste.

Some advantages of inkjet printing per se are:

Variable designs can be easily fabricated by ink jet printing, thus enabling the fabrication of different products within any production run. Mass customization becomes a possibility;

Since there is no contact between the ink jet head and the substrate that is being printed, ink jet printing is well-suited for fabricating on fragile substrates and those having topographical surface features (rough or smooth or 3-dimensional objects);

Ink jet printing can be used with both flexible and rigid substrates, and is well-suited for both;

Ink jet printing is a high speed process that yields accurate results and prints electronic components with high resolution (e.g., when compared to screen printing); and Ink jet printing is a relatively low cost process.

Ink jet printing allows for the deposition of different kinds of fluids such as hot-melt inks, solvent-based inks, water-based inks and energy curable inks, such as inks curable by ultraviolet (UV) energy and electron beam (EB) energy. For example, UV-curable inks are stable in the inkjet printing head, are solvent free, and can be rapidly printed into dielectric layers having good pattern resolution.

The majority of UV-curable inkjet fluids comprise substantial quantities of monofunctional monomers. During the UV-cure, it is highly unlikely that all of the monofunctional monomer content of the ink will be converted into polymer. As a consequence, a fraction of uncured monomer remains in the UV-cured dielectric inkjet layer. If this layer is then subjected to elevated temperatures that are commonly used in treating or fabricating electrical components, and in particular temperatures of 100° C. or higher, the uncured monomer may volatilize, leading to the failure of the printed electronic device. In particular, such treatment and fabrication processes include lamination, sintering of conductive tracks (e.g. sintering of silver inks at 100° C.-200° C.), and soldering. It is also common to test the lifetime of the electronic component by heating it at 120° C. for 500 hours. Where thermal treatments are practiced, and where the dielectric layer is embedded in the device, entrained volatile component remaining within the printed dielectric can be volatilized. Volatilization can cause significant damage of the device due to delamination, pinholing, fracturing, and blistering, among other effects. These failure modes can lead to loss of the insulating properties of the dielectric layer and to physical damage of the device.

Photoinitiators may be used in the UV-curing process to produce the initiating free radicals under the action of UV-light, which propagates the polymerization process. The photoinitiators themselves, and also their photodecomposition by-products, can be thermally volatile and can therefore also contribute to the failure of a UV-cured dielectric layer when subjected to elevated temperatures. Ink jet compositions may contain photoinitiators in amounts of 10 wt %.

EP 1 543 704 describes a UV-curable dielectric inkjet fluid that includes 5-95 wt % monofunctional monomers. As such, these inks would be prone to having a significant component of uncured monomer remaining after the UV-curing process, particularly at higher concentrations of monofunctional monomer. Furthermore, the photoinitiators described in the examples include species prone to migration and volatilization.

US2009/0163615 discloses ink jet compositions comprising monofunctional monomer (e.g., isobornyl acrylate) in amounts greater than 10% by weight, and which further include solvents. Thus, it is highly likely that a significant component of any UV-cured layer would consist of a volatile component.

US 2014/0151607, US 2014/0151606, and WO 2014/085473 describe UV-curable ink compositions which include relatively large amounts of monofunctional monomers. Furthermore, no restriction is placed on the volatility requirement of the photoinitiator. Also, relatively large amounts of potentially volatile photoinitiators may be included, for example, photoinitiators used in excess of 13.0 wt %.

WO 2014/111349 may also be of interest.

JP2003292857 describes UV-curable electrically-insulating inks comprising a polyester along with high concentrations of monofunctional monomer, such as phenoxyethyl acrylate.

US2015/0329730 discloses UV-curable inkjet compositions comprising various acrylate monomers and photoinitiators.

US2008/0085369 describes microfluid jet-printable water-based dielectric comprising polymer emulsions, humectants and surfactants. Such compositions may be prone to blocking the nozzles of a print head.

SUMMARY OF THE INVENTION

Inventive water based, energy curable ink jet compositions that have good insulating properties are described herein. The water based energy curable ink jet compositions comprise water and a water-soluble or water-dispersible component polymerizable by free radical polymerization, wherein the ink jet compositions exhibit a breakdown voltage, as determined in accordance with IPC SM840E Class H Specification, at 25 microns, of $\geq 20$ kv/mm; preferably $\geq 25$ kv/mm; more preferably $\geq 30$ kv/mm; more preferably $\geq 35$ kv/mm; and still even more preferably, $\geq 40$ kv/mm; still even more preferably $\geq 45$ kv/mm; and even most preferably, $\geq 50$ kv/mm.

In one aspect of the present disclosure, the water soluble or water dispersible component comprises a water soluble or water dispersible acrylated polyurethane polymerizable by free radical polymerization.

In another inventive aspect, the inventive ink jet compositions are free of, or are essentially free of, volatile components, such as unreacted monomer species. For example, no entrained volatile component is present in the inkjet composition.

In another inventive aspect, the inventive ink jet coating compositions comprise water. In another inventive aspect, the ink jet coating compositions comprise water and one or more co-solvents, such as, for example, water-compatible organic liquids.

In still another inventive aspect, the inventive ink jet coating compositions comprise a photoinitiator compound, included in the compositions to initiate and/or propagate a free radical polymerization reaction when the compositions are exposed to polymerizing energy, such as a UV-light source.

In still another inventive aspect, the inventive ink jet coating compositions comprise a colorant. In still another inventive aspect, the inventive ink jet coating compositions comprise an additive, such as for example a defoamer, a biocide, and a surfactant.

In another inventive aspect, described are electrical devices comprising substrates on which the inventive ink jet compositions are printed, preferably by ink jet printing, wherein the inventive ink jet compositions act as electrical insulators in the devices. In yet another inventive aspect, described are electrical devices comprising substrates on which the inventive ink jet compositions are printed, preferably by ink jet printing, wherein the inventive ink jet compositions act as electrical insulators in the devices, and wherein an electrically conductive ink layer is printed over the inventive ink jet composition, which also preferably is printed by ink jet printing.

The inventors have found that water-based, energy-curable ink jet compositions comprised of water soluble or water dispersible component that are polymerizable by free radical polymerization upon exposure to polymerizing radiation and which compositions, after energy curing, are essentially free of volatile components, can be printed by ink jet printing techniques and can be used as electrical insulators. Such compositions can be used to fabricate electrical devices and serve as dielectric, electrically insulating layers in such devices. One polymer material that is well suited for such ink jet compositions are acrylated polyurethanes present in water-based dispersions. As used herein, "Ac-PUDs" refers to acrylated polyurethane water based dispersions. The acrylated polyurethane polymer component of an Ac-PUD is nonvolatile, due to its polymeric nature, even before being cured. As such, any residual uncured material would not volatilize during any thermal treatment of the electronic device.

The acrylated polyurethane dispersions employed in the preferred aspect of the present invention include polyurethanes having pendant acrylate groups capable of participating in free radical polymerization, initiated, for example, by exposure to UV energy in the presence of a photoinitiator. Preferably, the (weight average) molecular weight of the acrylated polyurethanes is 1000 to 20,000 Daltons.

One of the advantages of such compositions over conventional UV-curable inkjet dielectric compositions is that after removal of water and co-solvent (if present), such compositions are comprised of nonvolatile materials, even more so after the compositions have been cured. As a result, electrical components and devices comprising electrical films and layers comprised of the water based energy curable ink jet compositions described herein do not have the problems faced by devices fabricated from conventional ink jet compositions that contain amounts of volatile components. Such problems, which may appear upon heat treatment, include, by way of example, delamination, pinholing, fracturing, and blistering. These failure modes can lead to loss of the insulating properties of the dielectric layer and to physical damage of the device.

This can be an issue with conventional 100% UV-curable inkjet compositions that rely on low molecular weight monomers and high concentrations of photoinitiators, which can volatilize during processes such as thermal treatments, in which the printed electronic component is subjected to high temperature treatments of 150° C. and higher. Such processes include lamination, sintering of conductive tracks (e.g. silver inks at 100° C.-200° C.), and soldering. It is also common to test the lifetime of the electronic component by heating it at 120° C. for 500 hours. In a thermal treatment of a currently available device having a dielectric layer embedded therein, entrained volatile component remaining within the printed dielectric can be volatilized. Volatilization can cause significant damage of the device due to delamination, pinholing, fracturing, blistering, among other effects. These failure modes can lead to loss of the insulating properties of the dielectric layer and to physical damage of the device.

Relatively dilute amounts of photoinitiators can be used in the inventive ink jet compositions, e.g., 0.1 wt % to 5% wt %, preferably 0.1 wt % to 3% wt %, more preferably 0.1 wt % to 1.5% wt %, and even more preferably 0.1 wt % to 1 wt %. These amounts are based on the total weight of the composition, prior to curing and solvent removal, e.g., drying. These amounts are considerably less than the photoinitiator amounts used in state of the art ink jet compositions, where amounts that are 10 wt % or more are used. This is clearly advantageous in instances where the compositions of the current invention are cured under the action of electron beam radiation, then no photoinitiator is required.

The inventors have found that compositions prepared according to the current invention perform effectively as dielectric insulators and overcome many of the issues associated with conventional 100% UV-curable inkjet compositions.

A further advantage that the inventors have discovered with compositions prepared according to the current invention is that they effectively receive other printed layers included in electronic devices, such as nano-silver dispersion layers, for example, oil-based compositions that comprise nano-silver dispersions. This is a particular advantage over conventional 100% UV-curable dielectric inkjet compositions. Improved adhesion of the printed silver tracks, as well as excellent electrical conductivity of the printed silver-containing conductive inkjet fluid, are realized when the present ink jet compositions are employed.

While the inventive ink compositions are primarily described as being printed by ink jet printing methods, the inventive inks can be printed by any suitable printing process. Non-contact printing methods, in addition to ink jet printing, are preferred. Such non-contact printing methods include aerosol jet printing and microfluidic jet printing. "Non-contact" means that the ink dispersing equipment does not make contact with the surface being printed. It should be appreciated by those skilled in the art that any deposition method—including direct printing methods, may be used to apply compositions of the current invention. Direct printing methods include screen printing, gravure printing, and flexographic printing methods.

After evaporation of the solvent and energy-curing, a dielectric electrically insulating layer is formed.

DETAILED DESCRIPTION OF THE INVENTION

Inventive water based, energy curable ink jet compositions that have good insulating properties are described herein. The inventive water based energy curable ink jet compositions comprise a water soluble or water dispersible component polymerizable by free radical polymerization upon exposure to polymerizing radiation, wherein the polymer product of free radical polymerization (ink jet composition) has good insulating properties, evidenced, for example, by a low dielectric constant.

The water soluble or water dispersible component preferably comprises a water soluble or water dispersible acrylated polyurethane polymerizable by free radical polymerization. Water dispersed acrylated polyurethane is particularly preferred as the polymerizable material in the water soluble or water dispersible component. In another inventive aspect, the water soluble or water dispersible component comprises acrylated polyurethane and one or more acrylate monomers and oligomers that also are polymerizable by free radical polymerization.

In another inventive aspect, the inventive ink jet compositions are free of, or are essentially free of, volatile components, such as unreacted monomer species.

In another inventive aspect, the inventive ink jet coating compositions comprise water. In another inventive aspect, the ink jet coating compositions comprise water and one or more co-solvents, such as, for example, water-compatible organic liquids.

In still another inventive aspect, the inventive ink jet coating compositions comprise one or more photoinitiators to initiate and/or propagate a free radical polymerization reaction when the compositions are exposed to polymerizing energy, such as a UV-light source.

In still another inventive aspect, the inventive ink jet coating compositions comprise a colorant. In still another inventive aspect, the inventive ink jet coating compositions comprise an additive, such as for example a defoamer, a biocide, and a surfactant.

In another inventive aspect, described are electrical devices comprising substrates on which the inventive ink jet compositions are printed, preferably by ink jet printing, wherein the inventive ink jet compositions act as electrical insulators in the devices. In yet another inventive aspect, described are electrical devices comprising substrates on which the inventive ink jet compositions are printed, preferably by ink jet printing, wherein the inventive ink jet compositions act as electrical insulators in the devices, and wherein an electrically conductive ink layer is printed over the inventive ink jet composition, which also preferably is printed by ink jet printing.

The water-based energy-curable compositions of the current invention, after evaporation of the water and solvent component, followed by energy-curing, form dielectric electrically insulating layers suitable in the manufacture of electrical and electronic devices. The advantages over the prior art, especially of 100% UV-curable inkjet compositions, is that the inventive compositions contain significantly lesser amounts of volatile components, and thus during heat treatment of the electrical devices, emit little to no volatile component, which reduces the possibility of developing failures, defects and other damage to the devices. Devices printed with the inventive ink jet compositions are thus likely to have longer useful lifetimes than conventional devices. Further, because the inventive ink jet compositions are more dilute than, for example, energy curable components, they can be deposited in thinner films exhibiting less thickness than what is currently available with 100% UV-curable inkjet compositions. This can be especially advantageous in the manufacture of flexible electronic devices.

Applicants have found that using the acrylated polyurethane dispersions in the inkjet compositions results in no outgassing, or limited outgassing, of components of the inks when the inks are subjected to high temperature treatments. This is in contrast to currently available compositions that include monomeric materials, which experience a large extent of outgassing during thermal treatment. Out gassing refers to volatilized components of the compositions that can occur when the composition is heated. For example, after a dielectric inkjet composition is printed on a substrate, a conductive layer comprised of, for example, silver nanoparticles may be applied over the dielectric layer. The printed substrate may then be subjected to a thermal treatment such as sintering at elevated temperatures, e.g., 125° C., 150° C. During the sintering, the monomeric material remaining in a currently available compositions, that is, material that has not cured during the curing step, may be subject to outgassing, e.g., volatilization, which could cause pinholes, cracking, and other defects in the printed layers. In contrast, the acrylated polyurethanes present in the inventive inkjet compositions are not subject to outgassing, i.e., volatilization, which may be due to higher molecular weight and/or multi-functionality of the polymer material.

Further, the present inkjet compositions contain photoinitiators in lesser amounts than the amounts found in currently available compositions that include monomeric materials. In the currently available compositions, more photoinitiator is required because the polymerizable materials are monomeric. This is in contrast to the present ink jet compositions which include oligomeric or polymeric materials, for which less photoinitiator is needed. Photoinitiators are also susceptible to volatilization during thermal treatment, and thus may contribute to the problems associated with outgassing.

Furthermore, compositions of the current invention do not shrink to the same extent as 100% UV-curable inkjet compositions, which can again be advantageous for the production of flexible electronic devices. When compositions of the invention are applied to thin flexible substrates, such as 12 µm polyester film, then dried and cured, there is no observable distortion (e.g., curling) of the printed film. When the same is done with conventional (solvent-free) UV-curable inkjet compositions, there is significant distortion as evidenced by curling. The thinner (dry) film weight depositions of the compositions of the current invention, compared with 100% UV-curable inkjet compositions, provides greater flexibility in the manufacturing process as it allows, via an additive process, greater control over the final film thickness of a dielectric layer than might be attainable with 100% UV-curable inkjet compositions.

Another advantage is that the inventive compositions are significantly less odorous after curing, which should appeal to customers who purchase the electronic devices. Conventional 100% UV-curable inkjet compositions can generate significant odor after cure as a result of the generation of photoinitiator decomposition products and residual uncured monomer. The compositions of the current invention do not incorporate low molecular weight monomers and, when UV-curing is employed, the compositions can contain significantly lower amounts of photoinitiators. When curing takes place with an electron beam apparatus, it is not necessary to include photoinitiators in the ink.

A further advantage of the inventive compositions over conventional (non-energy-curable) water-based inkjet compositions (which would comprise inert polyurethane and acrylic emulsions), is that they possess greater resolubility and hence do not have the same tendency to cause blockages of print head nozzles. One of the advantages of Ac-PUDs, such as those used in the present ink jet compositions, is their superior resolubility. Conventional, non-acrylated polyurethane and acrylic dispersions typically have much higher molecular weights (e.g., greater than 10,000) and when they dry and coalesce they form highly insoluble films. Acrylated PUDs (Ac-PUDs) rely on the free radical cross-linking process to bring about the desired resistance properties, and depending on the design of the Ac-PUD, they can have excellent resolubility. Ac-PUDs having improved resolubility can be anionically stabilized via pendant carboxylic acid groups on the polymer chain, e.g., they can be neutralized with involatile cations instead of volatile amines. After thermal drying, the carboxylic acid groups remain 'salted' with the involatile cations enabling the resolubility of the Ac-PUD. Ac-PUDs with good resolubility can also be formed by use of a non-ionic surfactant to aid dispersion.

Compared with conventional water-based and solvent-based inkjet compositions, the inventive compositions produce cross-linked inks/coatings after energy curing, which have significantly greater resistance to removal than non-cross-linked films of conventional water-based and solvent-based compositions. Compared to solvent-based inkjet compositions, the predominant solvent component in the inventive compositions is water, which is beneficial in terms of impact on the environment.

Sub-micron aqueous wax dispersions, and other additives such as silicones can be included in the water based, energy curable ink jet compositions of the present disclosure. The inclusion of these materials can provide for highly hydrophobic surfaces. A sub-micron aqueous wax dispersion is a wax dispersion/emulsion preferably with average particle sizes less than 1 micron. Other kinds of materials can be included to render the surfaces hydrophobic, such as waxes of polyethylene (LDPE and HDPE), paraffin waxes, carnauba waxes, and fluorinated waxes, to name a few. Such hydrophobic surfaces and the crosslinking that occurs in the inks upon curing, provide cured dielectric electrically insulating ink layers and coatings that are highly water repellent. This is advantageous in that the cured ink jet compositions of the present invention do not take up water—or exhibit extremely limited water uptake—in damp and humid conditions. This feature will maintain the electrical insulation performance of the cured ink films for extended periods of time.

The ink jet compositions in accordance with the present disclosure are very compatible to being overprinted with electrically-conductive inkjet compositions that comprise nano-silver dispersions. Such nano-silver dispersions include oil-based and hydrocarbon solvent based nano-silver inks. Silver nanoparticles have sizes of about 5 nm to 10 nm. After printing and thermal sintering of the nano-silver ink layers, superior adhesion and electrical conduction of the thus formed conductive tracks, e.g., the conductive element of the electronic device, are attained when printed over the inventive 100% UV-curable dielectric, electrically insulating inkjet compositions. This is an important feature of the invention as it permits the preparation of various electronic devices comprising such nano-silver particle containing electrically conducting inkjet compositions.

After water and, if present, co-solvent, are removed after energy-curing, the inventive water-based, energy-curable ink jet compositions form electrically insulating layers. Such layers may be applied prior to or after the fabrication of the conductive tracks of any electronic device. The present inkjet compositions have surprisingly been found to be especially suited to being printed along with electrically-conducting compositions comprising nano-silver dispersions, which for example may be printed over the electrically insulating dielectric layers comprised of the present inkjet compositions.

While the compositions of the present invention may be applied by any method, non-contact printing methods including inkjet and aerosol jet printing are preferred. The solvent component of the inventive compositions preferably comprises water, and may optionally one or more comprise one or more water-compatible organic co-solvents, e.g., organic solvents that are compatible with water. Particularly preferred organic co-solvents include those having flash points greater than 60° C., and boiling points greater than 125° C.

The water dispersible or water soluble component of the present inkjet may comprise one or more components that polymerize by free radical polymerization, a mechanism that can occur when the compositions, and thus the components thereof, are exposure to polymerizing radiation, e.g., an energy source, such as UV-light or electron-beam. Such components may polymerize by cationic and anionic processes. Where polymerization is to occur from exposure to UV-light, a photoinitiator may be present in the composition to initiate and/or propagate the polymerization reaction. Components that polymerize by free radical polymerization processes are especially preferred and include any components that comprising any of the following non-limiting polymerizable groups: acrylate, methacrylate, vinyl, vinyl ether, propenyl ether, acrylamide, and maleate. For example, acrylated acrylic dispersions, acrylated polyester dispersions, acrylated epoxy dispersions, and other dispersions polymerizable by free radical polymerization, such as by the presence of ethylenically unsaturated groups on the polymer material in the dispersion (as is the case with the preferred acrylated polyurethanes in aqueous dispersions) are contemplated by the present disclosure. The polymerizable materials may be either water-soluble or water-dispersible. Dispersions, including polyurethane dispersions, and especially acrylated polyurethane dispersions, are a preferred class of a curable water-dispersed material.

Other water-dispersible resins suited for the preparation of compositions according to the current invention include epoxy acrylates, such as CN132, a commercially available low viscosity aliphatic diacrylate oligomer that is available from Arkema.

The water-soluble or water dispersible component of the present inkjet compositions that are polymerizable by free radical polymerization may optionally comprise, one or more water soluble monomers, oligomers and polymers which also are polymerizable by free radical polymerization. Such monomers, oligomers and polymers include those that are polymerizable via cationic and anionic processes, with those that are free-radically polymerizable being preferred. Again, any free radically polymerizable groups on such water-soluble energy-curable materials may be included in the present inkjet compositions.

Compositions of the current invention can be cured by electromagnetic radiation sources that produce an actinic effect. Such sources include but are not limited to: electron beam, ultraviolet (UV) energy, visible-light energy, infrared (IR) energy, microwave energy, and light emitting diode (LED) energy. UV energy and electron beam energy are preferred. UV energy sources that are suitable for curing the inventive ink jet compositions include, for example, low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam. It should further be understood that the energy sources should emit sufficient energy to conduct polymerization, and/or that the deposited uncured inventive ink jet compositions receive sufficient exposure to the energy to conduct the polymerization In addition to the polymerizable water-dispersible and water-soluble components previously mentioned, the compositions of the current invention may further comprise any water-soluble or water-dispersible inert resins. "Inert resin" means a non-reactive resin that does not react with the other materials or functional groups in the ink jet compositions. Examples of such resins include; water-soluble acrylics (such as carboxylic acid functional types), poly(vinyl pyrolidone), poly(ethylene glycols), poly(vinyl alcohols), shellacs, acrylic emulsions such as those sold under the trade names Joncryl (BASF), Revacryl (Synthomer), Hycar (Lubrizol), Neocryl (DSM), Neboplast (Necarbo), and the Picassian AC range (Picassian Polymers), solution acrylics such as those sold under the trade names Joncryl (BASF), poly(meth) acrylic acid such as those sold under the trade name Sokalan (BASF), Polyurethane Dispersions such as those sold under the trade names Sancure (Lubrizol), Syntegra (Dow), Luplen (BASF), and Beetafin (BIP), polyester emulsions such as those sold under the trade names Eastek (Eastman), polyvinyl chloride (PVC) emulsions such as those sold under the trade names Vycar (Lubrizol), polyamide dispersions such as those sold under the trade names Casamid (Thomas Swann) and Hydrosize (Michelman), water-based alkyds such as those sold under the trade names Synaqua (Arkema), poly(vinyl alcohol) (PVA) resins such as those sold by Kuraray, Nippon Gohsei & Celanese, polyethylene glycols, poly(vinyl pyrrolidones) such as those sold under the trade names PVP-K15, K30, K60, K90 (ISP), Maleic Resins such as those sold under the trade names Hydrorez (Lawter) and Natural Resins such as Water-based shellacs (Worlee).

It should be noted however that such inert resins would preferably form a minor part of the total resin (or resin plus oligomer plus monomer) component of the inventive compositions. The inert resin may be present in the compositions in an amount of 1 wt % to 10 wt %, based on the total weight of the composition.

In addition to water, the inventive ink jet compositions may include one or more water-compatible organic solvents, such as, for example, ethanol, propanol, isopropanol, glycerol, propylene glycol, alkylene glycol ethers ether acetates, 4-Hydroxy-4-methyl-2-pentanone, diethylene glycol butyl ether, diethylene glycol ethyl ether, diethylene glycol methyl ether, diethylene glycol monoethyl ether acetate, diethylene glycol monopropyl ether, dipropylene glycol ethyl ether, dipropylene glycol methyl ether, ethylene glycol butyl ether, ethylene glycol ethyl ether, ethylene glycol isopropyl ether, ethylene glycol methyl ether, ethylene glycol propyl ether, glycerine carbonate, N-methyl 2-pyrollidone, propylene glycol, propylene glycol ethyl ether, propylene glycol ethyl ether acetate, propylene glycol methyl ether, propylene glycol n-propyl ether, triethylene glycol butyl ether, triethylene glycol methyl ether, tripropylene glycol tripropylene glycol methyl ether and mixtures thereof. Those solvents which have low flammability and low volatility are especially preferred; thus solvents having flash points greater than or equal to 60° C. and boiling points greater than or equal to 150° C. are preferred. Where water-compatible solvents are used, it is preferable that their concentration is less than 30 wt % of the total composition. The low flammability, involatile solvents can act as humectants, preventing drying of the ink in the inkjet heads and thus preventing them from clogging, and also function as a wetting aid, allowing the inkjet drops to spread on the substrate.

Acrylated polyurethane dispersions as previously stated are a preferred class of the polymeric, energy curable material. Suitable commercially available acrylated polyurethane dispersions include the following grades from the following suppliers: MS 10/1312 and MS 10/1311 (Allnex); Neorad R-440, R-441, R-444, R-447, R-448, R-465, UV-14, UV-20, UV-65, and UV-TN6711 (DSM); Laromer LR8949, LR8983, LR9005, UA 9059, UA9060, UA9064, and UA9095 (BASF); Bayhydrol UV 2282, UV 2317, UV VP LS 2280, UV VP LS 2317, UV XP 2629, UV XP 2687, UV XP 2689, UV XP 2690, and UV XP 2775 (BAYER).

Other suitable commercially available water-soluble or water-dispersible energy curable oligomers include; acrylated polyester dispersions such as the Laromer PE range from BASF, water-dilutable epoxy acrylates such as Laromer 8765 from BASF and CN132 from Sartomer, Styrene maleic anhydride adducts (SMA) where the anhydride group of a styrene-maleic copolymer is reacted with an OH-functional monomer.

Other water-soluble monomers and/or oligomers that may be included in the insulating inkjet compositions and which can polymerize with the polymer component of the water-soluble or water dispersible component include poly(ethylene glycol) diacrylates, poly(ethylene glycol) dimethacrylates, diacetone acrylamide, and methylene bisacryamide.

While it may not be necessary to include additional monomers in the low dielectric ink jet compositions, it is possible to include water-soluble or water-dispersible monomers. If such monomers are used, then preferably they are multifunctional (for example, two or more acrylate groups per molecule) and have molecular weights equal to or greater than 225 Daltons.

Oil-in-water dispersions of water-insoluble monomers and oligomers may be produced by suitable dispersion methods using surfactants. The following monomers and combinations thereof may be dispersed in this way: 2-PHENOXYETHYL ACRYLATE; 2-PHENOXYETHYL METHACRYLATE; C12/C14 ALKYL METHACRYLATE; C16/C18 ALKYL ACRYLATE; C16/C18 ALKYL METHACRYLATE; CAPROLACTONE ACRYLATE; CYCLIC TRIMETHYLOLPROPANE FORMAL ACRYLATE; ETHOXYLATED (4) NONYL PHENOL ACRYLATE; ISOBORNYL ACRYLATE; ISOBORNYL METHACRYLATE; ISODECYL ACRYLATE; LAURYL ACRYLATE; METHOXY POLYETHYLENE GLYCOL (350) MONOMETHACRYLATE; OCTYLDECYL ACRYLATE; POLYPROPYLENE GLYCOL MONOMETHACRYLATE; STEARYL ACRYLATE; TETRAHYDROFURFURYL ACRYLATE; TETRAHYDROFURFURYL METHACRYLATE; TRIDECYL ACRYLATE, and combinations thereof.

Examples of suitable polyfunctional ethylenically unsaturated monomers include but are not limited to the following (and combinations thereof): 1,3-BUTYLENE GLYCOL DIMETHACRYLATE; 1,4-BUTANEDIOL DIMETHACRYLATE; 1,6 HEXANEDIOL DIACRYLATE; 1,6 HEXANEDIOL DIMETHACRYLATE; ALKOXYLATED DIACRYLATE; DIETHYLENE GLYCOL DIMETHACRYLATE; DIPROPYLENE GLYCOL DIACRYLATE; ETHOXYLATED (10) BISPHENOL A DIACRYLATE; ETHOXYLATED (2) BISPHENOL A DIMETHACRYLATE; ETHOXYLATED (3) BISPHENOL A DIACRYLATE; ETHOXYLATED (3) BISPHENOL A DIMETHACRYLATE; ETHOXYLATED (4) BISPHENOL A DIACRYLATE; ETHOXYLATED (4) BISPHENOL A DIMETHACRYLATE; ETHOXYLATED BISPHENOL A DIMETHACRYLATE; ETHOXYLATED (10) BISPHENOL DIMETHACRYLATE; ETHYLENE GLYCOL DIMETHACRYLATE; POLYETHYLENE GLYCOL (200) DIACRYLATE; POLYETHYLENE GLYCOL (400) DIACRYLATE; POLYETHYLENE GLYCOL (400) DIMETHACRYLATE; POLYETHYLENE GLYCOL (400) DIMETHACRYLATE; POLYETHYLENE GLYCOL (600) DIACRYLATE; POLYETHYLENE GLYCOL (600) DIMETHACRYLATE; POLYETHYLENE GLYCOL 400 DIACRYLATE; PROPDXYLATED (2) NEOPENTYL GLYCOL DIACRYLATE; TETRAETHYLENE GLYCOL DIACRYLATE; TETRAETHYLENE GLYCOL DIMETHACRYLATE; TRICYCLODECANE DIMETHANOL DIACRYLATE; TRICYCLODECANEDIMETHANOL DIMETHACRYLATE; TRIETHYLENE GLYCOL DIACRYLATE; TRIETHYLENE GLYCOL DIMETHACRYLATE; TRIPROPYLENE GLYCOL DIACRYLATE; ETHOXYLATED (15) TRIMETHYLOLPROPANE TRIACRYLATE; ETHOXYLATED (3) TRIMETHYLOLPROPANE TRIACRYLATE; ETHOXYLATED (6) TRIMETHYLOLPROPANE TRIACRYLATE; ETHOXYLATED (9) TRIMETHYLOLPROPANE TRIACRYLATE; ETHOXYLATED 5 PENTAERYTHRITOL TRIACRYLATE; ETHOXYLATED (20) TRIMETHYLOLPROPANE TRIACRYLATE; PROPDXYLATED (3) GLYCERYL TRIACRYLATE; TRIMETHYLOLPROPANE TRIACRYLATE; PROPDXYLATED (5.5) GLYCERYL TRIACRYLATE; PENTAERYTHRITOL TRIACRYLATE; PROPDXYLATED (3) GLYCERYL TRIACRYLATE; PROPDXYLATED (3) TRIMETHYLOLPROPANE TRIACRYLATE; TRIMETHYLOLPROPANE TRIACRYLATE; TRIMETHYLOLPROPANE TRIMETHACRYLATE; TRIS (2-HYDROXY ETHYL) ISOCYANURATE TRIACRYLATE; DI-TRIMETHYLOLPROPANE TETRAACRYLATE; DIPENTAERYTHRITOL PENTAACRYLATE; ETHOXYLATED (4) PENTAERYTHRITOL TETRAACRYLATE; PENTAERYTHRITOL TETRAACRYLATE; DIPENTAERYTHRITOL HEXAACRYLATE, and combinations thereof.

Other functional monomers capable of being used in part in these formulations in an amount of 0 wt % to 40 wt % based on the total ink composition include cyclic lactam such as N-vinyl Caprolactam, N-vinyl oxazolidinone and N-vinyl pyrrolidone, and secondary or tertiary acrylamides such as acryloyl morpholine, diacetone acrylamide, N-methyl acrylamide, N-ethyl acrylamide N-isopropyl acrylamide, N-t.butyl acrylamide, N-hexyl acrylamide, N-cyclohexyl acrylamide, N-octyl acrylamide, N-t.octyl acrylamide N-dodecyl acrylamide, N-benzyl acrylamide, N-(hydroxymethyl)acrylamide, N-isobutoxymethyl acrylamide, N-butoxymethyl acrylamide, N,N-dimethyl acrylamide, N,N-diethyl acrylamide, N,N-propyl acrylamide, N,N-dibutyl acrylamide, N,N-dihexyl acrylamide, N,N-dimethylamino methyl acrylamide, N,N-dimethylamino ethyl acrylamide, N,N-dimethylamino propyl acrylamide, N,N-dimethylamino hexyl acrylamide, N,N-diethylamino methyl acrylamide, N,N-diethylamino ethyl acrylamide, N,N-diethylamino propyl acrylamide, N,N-dimethylamino hexyl acrylamide, N,N'-methylenebisacrylamide, and combinations thereof. Of these diacetone acrylamide is particularly preferred.

The present inkjet compositions may further include dispersions of oligomers polymerizable by free radical polymerization. Such oligomers may be present in the aqueous dispersions. Such oligomers include the following non-limiting examples: polyurethane acrylate oligomers, polyester acrylate oligomers, epoxy acrylate oligomers, and combinations thereof.

When producing dispersions of the aforementioned monomers and oligomers the dispersions should preferably have particle sizes with a $D_{95}$ of preferably less than 5 microns and more preferably less than 1 micron.

Although compositions of the current invention preferably comprise those curable species that polymerize by free radical polymerization, it should be appreciated by those skilled in the art that water-soluble and water-dispersible species comprising groups polymerizable by ionic (cationic or anionic) processes are also included. Thus, species comprising as part of their molecular structure groups such as the following non-limiting examples are also included: epoxy, oxetane, vinyl ether, propenyl ether, lactones lactams, and combinations thereof.

When the inventive ink jet compositions are to be cured by exposure to UV-energy, the compositions preferably further comprise a suitable photoinitiator. Both free radical, cationic and anionic photoinitiators may be employed in the present compositions, with free radical generating photoinitiators being preferred. Water-soluble and water-dispersible photoinitiators may be used. It should be noted that it is possible to cure compositions of the current invention under the action of UV-light, without the need for a photoinitiator. Thus, the current invention also includes the use of UVC radiation sources to cure compositions prepared according to the current invention.

Water-soluble and water-dispersible photoinitiators are preferred, in particular 1-[4-(2-Hydroxyethoxy)-phenyl]-2-hydroxy-2-methyl-1-propane-1-one (available commercially as Irgacure 2959, available from BASF) and any derivatives thereof and photoinitiators revealed in WO2015/183719. It should be appreciated that any water-soluble or water-dispersible photoinitiator can be used in compositions of the current invention and that it is possible to disperse any water-insoluble photoinitiator into compositions of the current invention by suitable methods. Thus, a photoinitiator may be incorporated into the disperse phase of any monomer, oligomer or polymer component of the compositions of the current invention. Also, the current invention includes instances where any photoinitiators are dispersed into the aqueous phase through appropriate dispersion methods involving the use of surfactants, the only proviso being that stable dispersions having particle sizes preferably less than 1 micron are formed. There is no limitation on the photoinitiators which can be used in compositions of the current invention and may include, but are not limited to; α-hydroxyketones such as; 1-hydroxy-cyclohexyl-phenyl-ketone; 2-hydroxy-2-methyl-1-phenyl-1-propanone; 2-hydroxy-2-methyl-4 '-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis [4-(2-hydroxy-2-methylpropionyl)phenyl]methane; 2-Hydroxy-1-[1-[4-(2-hydroxy-2-methylpropanoyl)phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one;

Acylphosphine oxides such as; 2,4,6-trimethylbenzoyl-diphenylphosphine oxide; ethyl (2,4,6-trimethylbenzoyl) phenyl phosphinate; bis-(2,4,6-trimethylbenzoyl)-phenylphosphine oxide, and combinations thereof;

α-aminoketones such as; 2-methyl-1-[4-methylthio)phenyl]-2-morpholinopropan-1-one; 2-benzyl-2-dimethyl-amino-1-(4-morpholinophenyl)-butan-1-one; 2-dimethyl-amino-2-(4-methyl-benzyl)-1-(4-morpholin-4-yl-phenyl)-butan-1-one, and combinations thereof;

Thioxanthones such as; 2-4-diethylthioxanthone, isopropylthioxanthone, 2-chlorothioxanthone, 1-chloro-4-propoxythioxanthone, and combinations thereof;

Benzophenones such as; such as benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate 1-[-4-[benzoylphenyl sulpho]phenyl]-2-methyl-2-(4-methylphenylsulphonyl)propan-1-one, and combinations thereof;

Phenylglyoxylates such as; phenyl glyoxylic acid methyl ester; oxy-phenyl-acetic acid 2-[hydroxyl-ethoxy]-ethyl ester, oxy-phenyl-acetic acid 2-[2-oxo-2-phenyl-acetoxy-ethoxy]-ethyl ester, and combinations thereof;

Oxime esters such as 1-phenyl-1,2-propanedione-2-(O-ethoxycarbonyl)oxime; [1-(4-phenylsulfanylbenzoyl)heptylideneamino]benzoate, [1-[9-ethyl-6-(2-methylbenzoyl) carbazol-3-yl]-ethylideneamino]acetate, and combinations thereof.

Examples of other suitable photoinitiators include diethoxy acetophenone; benzil; benzil dimethyl ketal; titanocen radical initiators such as titanium-bis(η 5-2,4-cyclopentadien-1-yl)-bis-[2,6-difluoro-3-(1H-pyrrol-1-yl) phenyl]; 9-fluorenone; camphorquinone; 2-ethyl anthraquinone, and combinations thereof.

An amine synergist may also be optionally included in the formulation. Suitable examples include, but are not limited to, the following:

Aromatic amines such as; 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid, with ethyl, amyl, 2-butoxyethyl and 2-ethylhexyl esters being particularly preferred; other positional isomers of N,N-dimethylamino)benzoic acid esters are also suitable. Combinations thereof may be used;

Aliphatic amines such as N-methyldiethanolamine, triethanolamine triisopropanolamine, and combinations thereof;

Aminoacrylates and amine modified polyether acrylates EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 ex DSM-AGI. Combinations thereof may be used;

Polymeric photoinitiators and sensitizers are also suitable, including, for example, polymeric aminobenzoates (GENOPOL AB-1 or AB-2 from RAHN, Omnipol ASA from IGM or Speedcure 7040 from Lambson), polymeric benzophenone derivatives (GENOPOL BP-1 or BP-2 from RAHN, Omnipol BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitizer Omnipol SZ from IGM. Combinations thereof may be used.

The inventive ink jet compositions may include one or more organic bases in order to raise the pH, including, but not limited to; ammonia, triethylamine, tripropylamine, triethanolamine, N-methyldiethanolamine, triisopropanolamine, dimethylaminoethanol arginine, and combinations thereof. Where acrylated polyurethanes are used in the inventive compositions it is preferable that any neutralizing agent be a tertiary amine. In a preferred aspect, pH is in the range of 5.0 to 10.0. Alternatively, the ink jet compositions may be neutralized by including an amount of an inorganic base, such as, for example, alkali metal oxides, alkali metal hydroxides, alkali metal carbonates, and combinations thereof. Sodium hydroxide and potassium hydroxide are the preferred inorganic bases. Where tertiary amines such as triethanolamine are used as neutralizing agents, they may function as a neutralizing agent and as an amine synergist actively involved in the production of free radicals in conjunction with the action of a photoinitiator.

Since the present inkjet compositions are primarily water-based in nature, it is also preferable to include a biocide or anti-mold agent. Suitable examples include products based on the following biocide structural types; benzo-isothiazolinone, bromo-nitro-propane-diol, isothiazolinone, ethyl enedioxydimethanol, iodo-propynyl butyl carbamate, and combinations thereof, which are marketed under the trade names Intercide (Akcros Chemicals) or Nipacide (Clariant). Other types of biocide that could be considered include sodium dehydroacetate (Geogard 111S from Lonza), sodium benzoate (Vancide 51 from R. T. VANDERBILT), sodium pyridinethiol-1-oxide (Sodium Omadine from Arch Chemicals), Sodium salt of o-phenylphenol (Dowicide A from DOW Chemical) and ethyl p-hydroxybenzoate (Nipastat Sodium from Aako). Combinations thereof may be used. These are preferably used at an amount of 0.01 to 1.00% by mass in the ink composition.

Defoamers can also optionally be included in the formulation. Defoamers prevent the formation of foam during manufacture of the ink and also while jetting. The inclusion of a defoamer is particularly useful when the inks are printed with recirculating printheads. Examples of suitable defoamers include TEGO FOAMEX N, FOAMEX 1488, 1495, 3062, 7447, 800, 8030, 805, 8050, 810, 815N, 822, 825, 830,831, 835, 840,842, 843, 845, 855, 860, 883, TEGO FOAMEX K3, TEGO FOAMEX K7/K8 and TEGO TWIN 4000 available from EVONIK. Available from BYK is BYK-066N, 088, 055, 057, 1790, 020, BYK-A 530, 067A, and BYK 354. The additives, DC62, DC65, DC 68, DC71 and DC74 are available from Dow Corning. Agitan 120, 150, 160, 271, 290, 298, 299, 350, 351, 731, 760, 761, 777 are available from Munzing. Surfynol 104PA, AD01, DF-110, DF-58, DF-62, DF-66, DF-695, Df-70, MD-20 are available from Air Products. Combinations of the above may be used.

Surface control additives, a/k/a surfactants, may optionally be used to control the surface tension of the ink which is required to adjust the wetting on the face plate of the printhead and also to give the desired drop spread on the substrate or in the case of multi pass inkjet printing, wet on dry drop spread. They can also be used to control the level of slip and scratch resistance of the coating. Examples of suitable surface control additives include but are not limited to TEGO FLOW300, 370,425, TEGO GLIDE 100, 110,130, 406, 410,411, 415, 420, 432, 435, 440, 482, A115, B1484, TEGO GLIDE ZG 400, TEGO RAD2010, 2011, 2100, 2200N, 2250, 2300, 2500, 2600, 2650, 2700, TEGO TWIN 4000, 4100, TEGO WET 240, 250, 260,265,270, 280, 500, 505, 510 and TEGO WET KL245 all available from EVONIK. Available from BYK are BYK 333,337, BYK UV3500, BYK 378, 347,361, BYK UV3530, 3570, CERAFLOUR 998, 996, NANOBYK 3601, 3610, 3650 and CERMAT 258. From CYTEC EBECRYL 350, 1360, MODAFLOW 9200, EBECRYL 341. From SARTOMER the aliphatic silicone acrylate CN9800 may be used. Surfynol 104, 420, 440, 465, 485, 61, 82, 2502 are available from Air Products. Multiwet BD, EF, SU, SO, VE are available from Croda. Capstone FS-30, 31, 34, 35, 50, 51, 60, 61, 63, 64, 65, 3100 are available from Du Pont. Combinations of the above may be used.

A deaerator may optionally be included in the ink jet composition to prevent the formation of air inclusions and pinholes in the cured coating. These also reduce rectified diffusion, which can cause reliability issues in the printhead. Examples include the following products available from EVONIK: TEGO AIREX900, 910, 916, 920, 931, 936, 940, 944, 945, 950, 962, 980, 986. Combinations of the above may be used.

The ink compositions of the present invention may optionally contain one or more colorants, including pigments and/or dyes. Examples of suitable organic or inorganic pigments include carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like. Combinations of the above may be used.

Commercial organic pigments classified according to Color Index International according to the following trade designations, blue pigments PB1, PB15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY155, PY156, PY175, PY180, PY185 and PY213; orange pigments P05, P015, P016, P031, P034, P036, P043, P048, P051, P060, P061 and P071; red pigments PR4, PR5, PR7, PR9, PR12, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; and black pigments. Combinations of the above may be used.

The pigments are milled to typically less than 1 micrometer after milling with a preferred particle size distribution of 10-500 nm, more preferably 10-350 nm to have better transparency and attain a wide color gamut.

In order to incorporate the above-described pigments to the inventive compositions, it is preferable that the pigments are manufactured and stably stored as a pigment concentrate in water. This may be achieved by dispersing the pigment into a water-soluble or water-dispersible resin using a water-soluble and/or a water-dispersible surfactant which introduces hydrophilic functional groups to the surface of the pigment particles. Examples of these dispersing agents include, for example, polyvinyl alcohols, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-alpha methyl styrene-acrylic acid copolymers, styrene-alpha methyl styrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, vinyl acetate-acrylic acid copolymers, combinations thereof, and the salts thereof. The copolymers can be used in any form of random copolymer, block copolymer, alternating copolymer and graft copolymer. Examples of such resins includes Joncryl 67, 678, 8500, 586, 611, 680, 682, 683 and 69 available from BASF. Combinations of these may be used. Examples of salts thereof include sodium hydroxide, potassium hydroxide and salts of basic compounds such as ammonia, ethylamine, diethanolamine, triethanolamine, propylamine, isopropylamine, dipropylamine, butylamine, isobutyl amine, diethanolamine, triethanolamine, triisopropanolamine, dimethyl ethanolamine, amino methyl propanol, and morpholine. The amount of the basic compound that it is not strictly limited as long as the resin dispersant is equal to or more than the neutralization equivalent.

To improve the hydrophobicity, as well as the slip and abrasion resistance of the surfaces of prints, compositions of the current invention may further comprise wax and silicone emulsions. There is no limitation on the nature of the wax or silicone emulsion other than that the particle size, as denoted by the $D_{95}$, is less than 5 microns and more preferably less than 1 micron. There is no restriction on the type of wax and dispersions of carnauba wax, beeswax, amide waxes, paraffin waxes, poly(ethylene) waxes, oxidized poly(ethylene) waxes and poly(propylene), and other waxes may be used. Similarly, there is no restriction on the nature of the silicone and both polydimethylsiloxane and polyether-siloxane types may be used. It is preferred that any such wax or silicone emulsion be either non-ionically or anionically stabilized. Combinations of these may be used.

A further aspect of compositions prepared according to the current invention is that they may optionally contain compounds which provide adhesion to metallic or ceramic surfaces. There is no restriction on the type of adhesion promoter. Alkoxy-silane adhesion promoters are preferred, such as tetramethylorthosilicate, tetraethylorthosilicate, triethoxymethylsilane, vinyltrimethoxysilane, (meth)acryloxypropyl trimethoxysilane, Glicidyloxypropyltrimethoxysilane, aminopropyltriethoxysilane. Combinations of these may be used. Where alkoxysilanes are used, it is preferred that they are used at in amounts of 0.1 wt % to 5 wt % and more preferably in amounts of 0.1 wt % to 2.5 wt %, based on the total weight of the inkjet composition. The alkoxysilanes may be added directly to the compositions or may be used as pre-prepared aqueous solutions/dispersions.

Compositions prepared according to the current invention may also optionally include silica. There is no particular restriction on the type of silica used so long as it is finely dispersed so as to not cause jetting issues during printing, such as the clogging of printhead nozzles or misdirected jets of ejected fluid drops. Silicas suitable for use in compositions of the current invention include, but are not restricted to; fumed silicas such as the Aerosil range from Evonik and nano colloidal silica dispersions such as the Bindzil range from Evonik. Other dispersions of inorganic particles may also be used, including, but not restricted to; alumina, zirconia, titania, ceria, zinc oxide, iron oxides. Clays, laponites, hydrotalcites, halloysites, and other inorganic lamellar type nanoparticles may also be used in compositions of the current invention. Combinations of these may be used.

The inclusion of these types of nanoparticles can further improve the electrical insulating properties of the inks and can induce thixotropy into the inks, which can help to improve the print resolution by minimizing the drop spread after printing.

The inkjet compositions of the current invention may be applied to a substrate by any suitable method. Deposition by inkjet printing and aerosol jetting processes are preferred. Inkjet printing processes include continuous ink jet printing and drop-on-demand. For drop-on-demand, thermal and piezo-electric driven printheads are suitable. Aerosol jetting equipment, such as what is commercially available from Optomec, is well suited to the preparation of electronic components and compositions using the inventive ink jet compositions.

Suitable substrates, include, for example, low temperature thermo-forming plastics, such as polycarbonate (PC), polycarbonate (PC) blends with acrylonitrile butadiene styrene (ABS), polyethylene terephthalate (PET/PETE), high temperature plastics for example polyimide (Kapton), polyether ether ketone (PEEK), polyamides (Nylon), polyimides, and inorganic substrates, such as, for example, glass and silicon. Copper clad FR4 is another suitable substrate.

The following examples illustrate specific aspects of the present invention and are not intended to limit the scope thereof in any respect and should not be construed in a limiting manner.

Examples

The following examples illustrate specific aspects of the present invention. They are not intended to limit the scope thereof in any respect and should not be construed as limiting.

To demonstrate the advantages that compositions of the current invention have over conventional UV-curable inkjet fluids in terms of both their print-receptivity to conductive inks and also their insulating properties, Inventive Examples 1 and 2, which are water-based formulations, were prepared. Inventive Example 1 is suitable for printing via inkjet and Inventive Example 2 is suitable for printing via an aerosol process. Also prepared were Comparative Examples, which are UV-curable inkjet coatings that do not contain water or solvent. Examples 1 and 2 and Comparative Examples 1 and 2 were tested. The compositions of the examples and comparative examples are given below in Tables 1 and 2. The amounts of the components are expressed in terms of weight percent (wt %). Also displayed in the tables are certain physical properties of the compositions.

TABLE 1

Inventive Examples 1 & 2

| | Inventive Example 1 | Inventive Example 2 |
|---|---|---|
| Deionized water | 26.0 | 30.95 |
| Radcure IRR813 | 26.0 | 30.0 |
| Propylene glycol | 30.95 | 35.5 |
| Triethanolamine | 0.2 | 0.2 |
| Trimethylolpropane | 15.5 | 2.0 |
| Irgacure 2959 | 1.0 | 1.0 |
| Agitan 120 | 0.05 | 0.05 |
| Capstone 3100 | 0.2 | 0.2 |
| Acticide MBS | 0.1 | 0.1 |
| Total | 100.00 | 100.00 |
| Surface Tension (mN m$^{-1}$) | 28.4 | 30.5 |
| Viscosity at 30° C. (mPa · s) | 9.8 | 14.2 |
| Solvent Resistance of UV-cured coating (MEK double rubs) | 15 | 75 |
| Water Resistance of UV-cured coating (Water double rub) | 100+ | 100+ |

Radcure IRR813 is an acrylated polyurethane dispersion, available from Allnex.

Irgacure 2959 is a water-soluble photoinitiator, available from BASF.

Agitan 120 is an aqueous emulsion of defoaming agents, available from Munzing.

Capstone 3100 is a non-ionic fluorosurfactant, available from DuPont.

Acticide MBS is a biocide, available from Thor.

Surface tensions were measured at 25° C. using a Kibron Aquapi tensiometer.

Viscosity was measured using a Brookfield DV-II+ Pro Viscometer equipped with Spindle no. 18, at 100 rpm.

Inventive Ink 1 has been printed through a Dimatix Material Printer, using a 10 picolitre cartridge at a Cartridge Temperature of 35 degrees, meniscus vacuum of 3 inches of $H_2O$, and using a standard waveform Dimatix Model Fluid 2.

Inventive Ink 2 has been printed through an industrial printhead the Dimatix S class, with a nominal drop volume of 30 picolitres the printer used was a Meyer Burger LP50 printer.

Optimal Printing Setting for printing a 30 picolitre drop at a drop speed 7 m/s were as follows: Head Voltage 120V, Pressure −22.0 mbar, Head Temperature 35 degrees C., using a Waveform Leading Edge 6 µs, Plateau 4 µs Falling Edge 7 µs.

These setting were used to generate films for testing breakdown voltage, and flexibility testing.

The solvent and water resistance of cured prints was assessed by applying 10 µm layers with a calibrated K-bar (available from RK Print) to a Leneta 2A test card. Considering the invention objectives, it would seem they should be applied via ink jet equipment and aerosol to a substrate such as silicon. The coatings were dried thoroughly before being cured through a Fusion UV Systems UV-Rig equipped with a medium pressure H-bulb. The belt speed was adjusted so that the UV-dose, as measured with a calibrated International Light Technologies ILT 490 Profiling Belt Radiometer (covering the UV-A and UV-B ranges), was 200 mJ/cm². The solvent resistance was then determined as the number of double rubs with a cotton wool bud soaked in either MEK (methyl ethyl ketone) or deionized water to disrupt the cured ink film.

The compositions for Comparative Examples 1 and 2 which are both 100% UV-curable inkjet coatings are provided in Table 2.

TABLE 2

Comparative Examples 1 & 2

|  | Comparative Example 1 | Comparative Example 2 |
|---|---|---|
| SR9003 | 29.79 |  |
| SR531 |  | 45.1 |
| VCap | 14.28 | 24.9 |
| SR489 | 11.14 |  |
| SR238 | 13.07 |  |
| SR399 | 19.11 |  |
| SR506D |  | 13.0 |
| CN965 | 3.27 | 4.0 |
| Omnirad TPO | 4.06 | 2.6 |
| Irgacure 819 | 4.06 | 2.6 |
| Omnirad 481 |  | 4.5 |
| TegoGlide 410 |  | 0.1 |
| Genorad 16 | 1.02 | 1.0 |
| Ionol 103 | 0.2 | 0.2 |
| Elvacite 2013 |  | 2.0 |
| Total | 100.00 | 100.00 |
| Surface Tension (mN m⁻¹) | 32 | 24 |
| Viscosity at 30° C. (mPa · s) | 15 | 10 |
| Solvent Resistance of UV-cured coating (MEK double rubs) | 100+ | 10 |
| Water Resistance of UV-cured coating (Water double rub) | 100+ | 100+ |

SR9003=Propoxylated 2-neopentyl glycol diacrylate, available from Sartomer. On average, there is one mole propoxylation per hydroxyl (of neopentyl glycol).

SR531=Cyclic Trimethylolpropane Formal Acrylate, available from Sartomer.

VCap=N-Vinylcaprolactam, available from BASF.

SR489=Tridecyl acrylate, available from Sartomer.

SR238=Hexanediol diacrylate, available from Sartomer.

SR399=Dipentaerythritol pentaacrylate, available from Sartomer.

SR506D=Isobornyl acrylate, available from Sartomer.

CN965=Urethane acrylate, available from Sartomer.

Omnirad TPO=2,4,6-trimethylbenzoyl-diphenyl phosphineoxide, available from IGM Resins.

Irgacure 819=Bis(2,4,6-trimethylbenzoyl)-phenylphosphineoxide, available from BASF.

Omnirad 481=1-Hydroxycyclohexyl-phenyl ketone, available from IGM Resins.

TegoGlide 410=Polyether Polysiloxane, available from Evonik.

Genorad 16=Inhibitor solution, available from Rahn.

Ionol 103=Antioxidant (2,6-di-tert-butyl-4-(dimethylaminomethyl)phenol), available from Oxiris.

Elvacite 2013=Acrylic Resin, available from Lucite International.

Each of the four (4) exemplary compositions was applied to polyimide film at 10 µm using a calibrated K-Bar (available from RK Print in order to assess the properties of the inks.

Before UV-curing, Inventive Examples 1 and 2 were dried for 60 seconds using a portable hot air blower (available from Babyliss). The coatings were then cured through the aforementioned Fusion UV-rig with a dose of 600 mJ/cm². The coated polyimide films were then heated for 30 minutes at 125° C. A conductive silver track was then printed onto the coated polyimide films using a Meyer Burger Pixdro LP50 printer, equipped with a Dimatix S-Class print head, to apply EMD5800, an oil-based nanosilver ink that is available from Sun Chemical. The printed polyimide films were then heated at 125° C. for 30 minutes to induce sintering of the silver nanoparticles.

The conductivity of the sintered silver tracks was measured using a two point resistance meter. The conductivity of the silver tracks printed onto the Comparative Example 1 & 2 coatings was poor, with resistances in excess of 1 kilo ohm. The silver track printed on Inventive Example 1 was found to be conductive; resistance was 0.5 Ohm. The conductive track applied over Inventive Example 2 was also conductive; resistance was 0.3 Ohm.

To further explore the adhesion of the printed materials to the underlying dielectric layer, the adhesion of the sintered silver tracks was assessed via a tape test, using ISO2409 adhesive tape (available from Elcometer). The adhesive tape was applied over the silver tracks and then removed at 90° to the printed film. In the case of the Comparative Examples 1 & 2, the silver track was completely removed from the polyimide film whereas the silver tracks applied over Inventive Examples 1 & 2 showed no silver ink removal. Furthermore, after the adhesion test, the printed silver tracks on the Inventive Examples 1 & 2 maintained their conductivity with no significant change in the electrical resistance.

These findings confirm that compositions prepared according to the current invention act most effectively as print-receptive layers for printable conductive inks.

Insulating Properties and Bend Tests

Inventive Example 1, Comparative Example 1, and Comparative Example 2 were tested for dielectric strength in order to determine breakdown voltage. Dielectric strength measurement is determined according to IPC TM 650 2.5.6. Breakdown Voltage is determined according to IPC SM840E Class H Specification. These inkjet compositions were applied to Copper clad FR4 to assess breakdown voltage.

An insulating material should exhibit a breakdown voltage that is, at 25 microns ≥20 kv/mm; preferably ≥25 kv/mm; more preferably 3≥0 kv/mm; more preferably ≥35 kv/mm; and still even more preferably; ≥40 kv/mm; still even more preferably ≥45 kv/mm; and even most preferably, ≥50 kv/mm.

The flexibility of these examples is also determined by subjecting coated samples to a 180° Bend Test, in which the samples are bent inwards 180°. A bent sample fails the test when it exhibits cracking and delamination (e.g., flaking), A bent sample gets a very good grade when it exhibits a small amount of cracking and no delamination. A bent sample gets an excellent grade when it exhibits no visible cracking. These inkjet compositions were applied to polyimide substrate for the bend test assessment.

TABLE 3

|  | Comparative Example 1 | Comparative Example 2 | Inventive Example 1 |
|---|---|---|---|
| Breakdown Voltage (kv/mm at 25 microns) | 45 | 38 | 37 |
| 180° Bend | Fail | Very Good | Excellent |

The ink composition of Comparative Example 1 has a high cross link density, due to the inclusion of multi-functional monomers in the composition, which cross-link on curing, and therefore have a lower out gassing. It was found that the ink was brittle as demonstrated in the bend test, where it cracked when printed with the conductive silver ink.

The ink composition of Comparative Example 2 has a low cross link density since it includes mono-functional monomers, and therefore a higher level of out-gassing. This ink composition exhibited some cracking as demonstrated in the bend test when conductive ink was printed there over.

Inventive Ink 1 has a higher linear cross link density and therefore lower out-gassing, and is shown to be flexible as demonstrated in the bend test, where no cracking was seen when conductive ink was printed there over.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A water based energy curable ink jet composition, comprising water and a water-soluble or water-dispersible component polymerizable by free radical polymerization, wherein the water dispersible component comprises a polymer and a monomer that are polymerizable by free radical polymerization upon exposure to polymerizing radiation; and the ink jet composition exhibits a breakdown voltage, as determined in accordance with IPC SM840E Class H Specification, of ≥20 kv/mm.

2. The water based energy curable ink jet composition claim 1, wherein one or both of the polymer and monomer include one or more groups selected from acrylate, methacrylate, vinyl, vinyl ether, propenyl ether, acrylamide, and maleate.

3. The water based energy curable ink jet composition of claim 1, wherein the water dispersible component comprises a component in an aqueous dispersion selected from acrylated-polyurethane, an epoxy-acrylate polymer, and mixtures thereof.

4. The water based energy curable ink jet composition of claim 1, wherein the water-soluble or water-dispersible component is an acrylated polyurethane polymer present in an aqueous dispersion.

5. The water based energy curable ink jet composition of claim 1, wherein the composition is free of volatile components.

6. The water based energy curable ink jet composition of claim 1, wherein the composition further comprises a photoinitiator.

7. The water based energy curable ink jet composition of claim 6, wherein the photoinitiator is present in an amount of 0.1 wt % to 5 wt %.

8. The water based energy curable ink jet composition of claim 1, wherein the composition does not contain photoinitiator.

9. The water based energy curable ink jet composition of claim 1, further comprising one or more water-soluble organic co-solvents.

10. The water based energy curable ink jet composition pf claim 1, wherein the composition is cured by exposure to energy generated by an energy source selected from electron-beam, ultraviolet energy, visible-light energy, infrared energy, microwave energy, and light emitting diode energy.

11. The water based energy curable ink jet composition of claim 1, further comprising one or more inert resins.

12. The water based energy curable ink jet composition of claim 1, wherein the polymer in the water dispersible component has a particle size $D_{95}$ of less than 5 microns.

13. The water based energy curable ink jet composition of claim 1, wherein the ink jet composition exhibits a breakdown voltage, as determined in accordance with IPC SM840E Class H Specification, of ≥25 kv/mm.

14. An electronic device comprising a substrate and a dielectric ink-jet printed film comprising the water based energy curable ink jet composition of claim 1.

15. The electronic device of claim 14, further comprising a conductive ink layer printed over the ink-jet printed film.

16. The electronic device of claim 15, wherein the conductive ink layer comprises a nano-silver dispersion having silver particle sizes of 5 nm to 10 nm.

17. A method of fabricating an electronic device comprising printing the water based energy curable ink jet composition of claim 1 on a substrate by ink jet printing, and curing the ink jet composition by exposing same to polymerizing radiation, whereby free radical polymerization occurs.

18. The method of fabricating an electronic device of claim 17, further comprising drying the ink jet composition prior to curing.

19. The method of fabricating an electronic device of claim 17, further comprising printing a conductive ink layer over the ink jet composition.

20. The water-based energy curable ink composition of claim 1, wherein the acrylated polyurethane polymer present in an aqueous dispersion has pendant acrylate groups capable of participating in free radical polymerization.

21. The water-based energy curable ink composition of claim 1, wherein the acrylated polyurethane polymer present in an aqueous dispersion has a weight average molecular weight of 1000 to 20,000 Daltons.

22. A water based energy curable ink jet composition, comprising water and a water-soluble or water-dispersible component polymerizable by free radical polymerization, the water-soluble or water-dispersible component polymerizable by free radical polymerization comprising an acrylated-polyurethane polymer present in an aqueous dispersion, wherein the ink jet composition exhibits a breakdown voltage, as determined in accordance with IPC SM840E Class H Specification, of ≥20 kv/mm.

23. The water-based energy curable ink composition of claim 22, wherein the acrylated polyurethane polymer present in an aqueous dispersion has a weight average molecular weight of 1000 to 20,000 Daltons.

* * * * *